Patented Nov. 3, 1953

2,658,063

UNITED STATES PATENT OFFICE 2,658,063

TETRAHYDROFURFURYLGLYCAMINES AND PROCESS FOR PRODUCING SAME

John B. Tindall, Terre Haute, Ind., and John W. Fraza, Jr., Joplin, Mo., assignors to Commercial Solvents Corporation, Terre Haute, Ind., a corporation of Maryland No Drawing. Application October 27, 1951, Serial No. 253,555

10 Claims. (Cl. 260—211)

The present invention relates to a new group of chemical compounds. More particularly, it relates to N-tetrahydrofurfurylglycamines and to a method for their preparation.

The compounds falling within the scope of my invention include those having the structural formula:

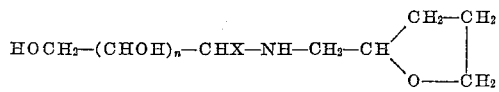

wherein $n$ is 2, 3 or 4 and X is H or $CH_2OH$. In the formula N can be attached to either the number 1 or number 2 carbon atom of the polyhydroxy chain. That is, compounds having the structural formula:

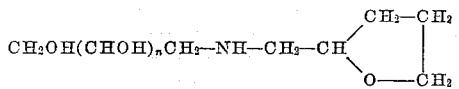

wherein $n$ is 3 or 4 are included, as are compounds having the formula:

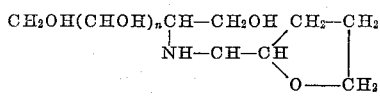

wherein $n$ is 2 or 3.

Any one of several different systems of nomenclature can be applied to compounds of the type covered by above structural formulas. The systematic names would be 1-desoxy-1-tetrahydrofurfurylaminoglykitols and 2-desoxy-2-tetrahydrofurfurylaminoglykitols. Throughout this specification and the appended claims the generic term glycamine is used to denote the derivatives of sugar alcohols in which a CHO or CO group has been replaced by a $CH_2NHR$ group. By this system of nomenclature the names of the individual members of the group are derived from the stem of the name of the corresponding sugar to which the word amine is added, for example, glucamine from glucose, ribamine from ribose, fructamine from fructose, etc. As specific examples of the compounds falling within the above structural formulas may be mentioned N-tetrahydrofurfurylglucamine, N-tetrahydrofurfurylxylamine, N-tetrahydrofurfurylgalactamine, N-tetrahydrofurfurylribamine, N-tetrahydrofurfurylarabinamine, N-tetrahydrofurfurylmannamine and the like.

The N-tetrahydrofurfurylglycamines comprising my invention can be prepared by reacting, in an aqueous medium, a sugar containing 5 or 6 carbon atoms, either of the aldose or ketose type, with furfurylamine and hydrogen, under elevated pressures and at temperatures between 40 and 80° C., in the presence of a hydrogenation catalyst.

When a reducing sugar is reacted with furfurylamine under the conditions comprising the present invention it would be expected that N-furfurylglycamines would result. This is because temperatures well in excess of 100° C. have always been considered necessary for reduction of the heterocyclic furyl ring of furfurylamine. Contrary to these expectations, however, I have now discovered that when a reducing sugar is present and when water is used as the solvent for the reactants, the heterocyclic furyl ring of furfurylamine is completely hydrogenated at temperatures within the range 40 to 80° C. When temperatures below 40° C. are employed hydrogenation of the ring is not effected. When temperatures above 80° C. are employed the furyl ring is hydrogenated and N-tetrahydrofurfurylglycamines result, but the products are of a dark, objectionable color due to caramelization.

While the reaction may be carried out in either an aqueous or an alcoholic medium, I have discovered that complete hydrogenation occurs in about one half the time when water is used. This was completely unexpected in view of the prior art knowledge that water and alcohol are equally advantageous for catalytic reduction of furfurylamine in the absence of a sugar.

For efficient reaction to take place it is essential that good contact between the reactants and the catalyst be maintained. This can be effected by external agitation of the reaction vessel or by internal stirring. In fact, any method whereby the gas, liquid and catalyst are brought into intimate contact will expedite the reaction.

I have found, in general, that any suitable base metal hydrogenation catalyst that is active at the desired operating temperature can be used in my process. A number of such hydrogenation catalysts are described in Hydrogenations of Organic Substances, 3d edition, 1930, by Carleton Ellis. Nickel catalysts are preferred to other base metal catalysts, e. g. copper, cobalt, copper chromite, etc. I prefer to use a finely divided nickel catalyst, the preparation of which is described in U. S. Patent 1,628,190 by Murray Raney.

The use of moderately high pressures is advantageous because it increases the rate of hydrogenation. It is preferred to operate at pressures between 500 and 2000 pounds per square inch, but slightly lower pressures can be used. The upper pressure is limited only by the strength of the reaction vessel.

The reducing sugar or glycose used in the process of my invention can be any monosaccharide of the ketose or aldose type containing 5 or 6 carbon atoms. As specific examples of the sugars there may be mentioned glucose, arabinose, ribose, lyxose, xylose, gulose, mannose, idose, allose, galactose, altrose, talose, fructose, and the like.

In carrying out my invention approximately equimolecular proportions of the sugar and furfurylamine are dissolved in water and introduced, together with a catalyst, to a suitable pressure hydrogenation apparatus, and sealed. Such an apparatus may be of the Adkins type which comprises a cylindrical steel reaction vessel fitted with flexible tubing for the introduction of hydrogen gas under pressure. The apparatus is preferably kept in motion during the hydrogenation in order to insure thorough mixing of the sugar, the amine, the hydrogen, and the catalyst. The reduction vessel may be wrapped with an electrical heating coil and cooling means may also be provided in order that the hydrogenation may be carried out at the desired temperature. After the hydrogenation is complete, the reaction mixture is removed from the apparatus and the resulting N-tetrahydrofurfurylglycamine is separated.

When the absorption of hydrogen has ended, the reaction mixture is removed from the vessel and the catalyst removed by filtration. Before recovery, it is desirable that additional water be added to dissolve any remaining solids resulting from cooling of the filtrate to room temperatures. The resulting solution is then concentrated and the concentrate cooled to about 17° C. with stirring. The solution is then centrifuged, and the crystals washed in the centrifuge with water or methanol.

A better understanding of the nature of my invention can be had by reference to the following examples, which are given by way of illustration only and are in no way intended to limit the scope of my invention.

EXAMPLE I

A mixture of 180 grams (1.0 mole) of pure glucose and 107 grams (1.1 moles) of furfurylamine in 500 ml. of water was introduced, together with 10 grams of nickel catalyst, into an Adkins type hydrogenation apparatus. Hydrogen was introduced and maintained at a pressure of 1000 pounds per square inch for 6 hours and the temperature was maintained at 60° C. About 3 moles of hydrogen were absorbed, indicating that the furyl ring, as well as the double bond originating from the aldehyde group of the glucose, had been completely hydrogenated. The product crystallized before the catalyst was removed and it was necessary to heat the solution to filter it. After filtration to remove the catalyst the product was diluted with 500 ml. of additional water to dissolve the solids. Upon concentration and centrifugation white crystals melting at 159-161° C. were obtained in 58% yield, based on the glucose used. The product was identified by ultraviolet and infrared absorption, by amount of hydrogen absorbed, by melting point comparisons, etc.

For comparison with the product from the above example, a sample of N-tetrahydrofurfurylglucamine was prepared by reacting 0.92 mole of tetrahydrofurfurylamine with 0.92 mole of glucose in 500 ml. of water using 15 grams of nickel catalyst at 60° C. and 1000 pounds per square inch of hydrogen pressure. The product prepared in this manner also had a melting point of 159-161° C., indicating that N-tetrahydrofurfurylglucamine is prepared by the reduction of a mixture of glucose and furfurylamine in water under the conditions employed. A 41.3% yield of N-tetrahydrofurfurylglucamine was obtained by the process employing tetrahydrofurfurylamine.

EXAMPLE II

A mixture of 180 grams of American Maize Glucose (.92 mole glucose) and 107 grams of furfurylamine (1.1 moles) and 500 ml. of water was introduced into the hydrogenation apparatus together with 15 grams of nickel hydrogenation catalyst. Hydrogen was then introduced and maintained at a pressure of about 1000 pounds per square inch, while the temperature was maintained at 60° C. After a total of 2.9 moles of hydrogen had been added over a period of 5 hours no further pressure drop was noted. Using the recovery procedure outlined in Example I clean white crystals of N-tetrahydrofurfurylglucamine were separated.

In another run exactly the same as described above, except that 500 ml. of methyl alcohol was substituted for the water, only 2.0 moles of hydrogen were absorbed after a period of 13½ hours. Analysis showed the product from this run to be N-tetrahydrofurfurylglucamine, but the crystals were of a dark objectionable color.

EXAMPLE III

A series of hydrogenations was carried out to determine the effect of reaction temperature on the products. In each run, the charge to the hydrogenation apparatus consisted of 180 grams of American Maize Glucose (0.92 mole of glucose), 89 grams (0.92 mole) of furfurylamine, 15 grams of nickel catalyst, and 670 ml. of water. Hydrogen was then introduced and maintained at a pressure of about 1000 pounds per square inch until hydrogen absorption ceased. The temperature, amount of hydrogen absorbed, time, and color of the resulting product are shown in Table A below.

Table A

| Run No. | Temperature, °C. | H₂ absorbed, moles | Time, hours | Color of final product |
|---|---|---|---|---|
| 5,045 | 40 | 1.9 | 7½ | White. |
| 5,006 | 50 | 2.2 | 6 | Do. |
| 4,955 | 60 | 2.3 | 7 | Do. |
| 4,960 | 80 | 2.5 | 5 | Do. |
| 4,961 | 100 | 2.7 | 4½ | Dark tan. |
| 4,962 | 130 | 2.7 | 5 | Do. |
| 4,963 | 160 | 2.1 | 6½ | Brown. |

EXAMPLE IV

The results given in Table B below indicate that variations in the hydrogen pressure used between 500 and 1700 pounds per square inch do not appreciably affect the reduction of glucose and furfurylamine to N-tetrahydrofurfurylglucamine. In the runs reported in Table B the hydrogenation apparatus was charged with a mixture of 180 grams American Maize Glucose (0.92 mole glucose), 89 grams of furfurylamine, 15 grams of nickel catalyst and 670 ml. of water. The temperature in each of these runs was maintained at about 60° C. throughout the hydrogenation.

Table B

| Run No. | Pressure, p. s. i. | H₂ absorbed, moles | Time, hours |
|---|---|---|---|
| 4,964 | 500 | 2.5 | 8½ |
| 4,997 | 1,000 | 2.2 | 6 |
| 4,965 | 1,500 | 2.5 | 9 |
| 4,996 | 1,700 | 2.2 | 4½ |

EXAMPLE V

Into an Adkins type hydrogenation apparatus there was added a mixture of 49 grams of furfurylamine (0.505 mole), 75 grams of xylose (0.50 mole), 15 grams of nickel catalyst and 700 ml. of water. Hydrogen was then introduced at 1000 lbs. per square inch pressure and the temperature was maintained at 60° C. until hydrogen absorption ceased. The recovery procedure reported in Example I gave white crystals of N-tetrahydrofurfurylxylamine.

The above examples are merely descriptions of procedures that are included within the scope of our invention and do not limit it in any manner. For example, our invention is not to be limited to the type of apparatus in which the hydrogenation may be carried out. Any reducing sugar having from 5 to 6 carbon atoms can be substituted for the glucose and xylose of the above examples. Optimum conditions such as temperature, hydrogen pressure, and catalyst may be determined experimentally for any particular sugar to be treated, and any such variations are included within the scope of our invention.

The tetrahydrofurfurylglycamines of our invention are useful as detergents, wetting agents, textile lubricants, and other uses where amino compounds may be desirable.

This application is a continuation-in-part of our application Ser. No. 187,355 filed September 28, 1950.

What we claim is:

1. As new compositions of matter, N-tetrahydrofurfurylglycamines having the formula:

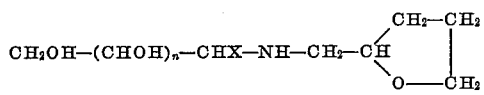

wherein $n$ is an integer selected from the group consisting of 2, 3, and 4 and X is hydrogen when $n$ is 4, X is CH₂OH when $n$ is 2, and X is selected from the group consisting of hydrogen and CH₂OH when $n$ is 3.

2. The composition of claim 1 in which $n$ is 3, and X is hydrogen.

3. The composition of claim 1 in which $n$ is 4, and X is hydrogen.

4. The composition of claim 1 in which $n$ is 2, and X is —CH₂OH.

5. The composition of claim 1 in which $n$ is 3, and X is —CH₂OH.

6. A process for preparing N-tetrahydrofurfurylglycamines which comprises heating a mixture comprising essentially hydrogen, a reducing sugar having from 5 to 6 carbon atoms, furfurylamine, and water, at a temperature between 40 and 80° C. and a pressure of at least 500 pounds per square inch, in the presence of a base metal hydrogenation catalyst.

7. A process for preparing N-tetrahydrofurfurylglycamines which comprises heating a mixture comprising essentially hydrogen, a reducing monosaccharide having from 5 to 6 carbon atoms, furfurylamine, and water, at a temperature between 40 and 80° C. and at a pressure between 500 to 2000 pounds per square inch, in the presence of a nickel hydrogenation catalyst.

8. A process for preparing N-tetrahydrofurfurylglucamine which comprises heating a mixture of hydrogen, glucose, furfurylamine, and water, at a temperature between 40 and 80° C. and at a pressure between 500 to 2000 pounds per square inch, in the presence of nickel hydrogenation catalyst.

9. A process for preparing N-tetrahydrofurfurylglucamine which comprises heating a mixture comprising essentially hydrogen, glucose, furfurylamine, and water, at a temperature between 50 and 70° C. and at a pressure between 500 and 2000 pounds per square inch, in the presence of nickel hydrogenation catalyst.

10. A process for preparing N-tetrahydrofurfurylglycamines which comprises subjecting a mixture of approximately equimolecular proportions of a reducing sugar having from 5 to 6 carbon atoms and furfurylamine in a water solution to from 500 to 2000 pounds per square inch of hydrogen pressure, at a temperature between 40 and 80° C. in the presence of a base metal hydrogenation catalyst.

JOHN B. TINDALL.
JOHN W. FRAZA, JR.

References Cited in the file of this patent

UNITED STATES PATENTS

| Number | Name | Date |
|---|---|---|
| 2,016,962 | Flint et al. | Oct. 8, 1935 |
| 2,016,963 | Flint et al. | Oct. 8, 1935 |
| 2,173,711 | Clifford | Sept. 19, 1939 |
| 2,190,865 | Dickey et al. | Feb. 20, 1940 |
| 2,233,001 | Dickey et al. | Feb. 25, 1941 |
| 2,426,011 | Friedman et al. | Aug. 9, 1947 |